Figure 1:
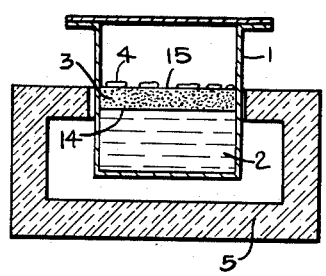

Aug. 9, 1955 — P. WEISS — 2,715,063

METHOD FOR THE RECOVERY OF PURE ALUMINUM

Original Filed Sept. 21, 1951

INVENTOR.
PAUL WEISS

BY

HIS AGENTS.

United States Patent Office 2,715,063
Patented Aug. 9, 1955

2,715,063

METHOD FOR THE RECOVERY OF PURE ALUMINUM

Paul Weiss, Grevenbroich, Germany, assignor to Vereinigte Aluminiumwerke, Aktiengesellschaft, Bonn am Rhine, Germany, a corporation of Germany Original application September 21, 1951, Serial No. 247,629, now Patent No. 2,697,597, dated December 21, 1954. Divided and this application September 10, 1952, Serial No. 308,759

Claims priority, application Germany September 22, 1950

5 Claims. (Cl. 75—68)

The invention relates to the recovery of pure aluminum from aluminum containing initial materials with volatile aluminum components and it is a division from my copending U. S. patent application Ser. No. 247,629, filed September 21, 1951, now Patent No. 2,697,597.

In the purification of aluminum containing materials by means of aluminum halogenides and particularly aluminum chloride vapors the reacting gases are generally conducted in a circular cycle. Considerable difficulties are hereby experienced with regard to the necessary heating and cooling devices in view of the high reaction temperature and the chemical attack of the reacting gases.

It is the main object of this invention to eliminate these drawbacks and difficulties.

It is also an object of the invention to replace the hitherto customary cycle reaction by a straight flow of the reacting gases and vapors.

The invention is based on the recognition that above recited objects can be realized in a simple and efficient manner, if the face where the aluminum is taken up by the volatile reactant at a high temperature, and the face where the aluminum is condensed from the vaporous state at a lower temperature, are located oppositely to each other at a comparatively small distance and the metal exchange is caused by diffusion in replacement of the circulation of the reacting gases and vapors. It is, of course, necessary to maintain a suitable temperature difference between the above mentioned aluminum vapor entering and aluminum vapor condensing faces.

In order to realize this aim, one or several cooled faces may be located above the crude molten aluminum, in such a manner, that the metal taken up from the impure melt by means of aluminum halogenides, and particularly aluminum chloride vapors, is condensed and separated on these cooled faces in a solid state.

However, a great disadvantage is involved in this procedure and this consists of the excessive heat losses and in the danger of a reunion of the crude and purified metal.

In order to render the above recited procedure practicable and efficient, a gas pervious layer of chemically and thermally resistant materials is located between the surface of the molten impure aluminum containing melt and the separator surface; the metal exchange in the gaseous phase is not materially influenced thereby.

For practical purposes, a loose gas pervious layer or diaphragm of granular, chemically inert materials of a small heat conductivity and small diffusion resistance is located upon the impure aluminum melt.

This layer may consist of loose pulverulent or fine materials, such as alumina or magnesium oxide, which are substantially inert to the influence of aluminum and aluminum halogenides. This layer may be applied as a coherent gas pervious body. The further advantage is hereby gained that the heat exchange by radiation and convection between the aluminum receiving and the aluminum separating faces is greatly reduced. On the other hand, the presence of a poorly heat conductive layer bears the guarantee that the temperature reduction required for the condensation of the pure aluminum vapors is fully secured.

The natural heat decrease from the impure aluminum melt towards the surrounding atmosphere generally suffices to obtain the required temperature difference within the gas pervious layer and a cooling device will only be required, if very large installations are used.

A special aluminum depositing means need not be applied, since the outside face of the porous layer satisfactorily serves the purpose of aluminum condensation and separation, if it is kept at a lower temperature than the surface of the impure aluminum melt.

A reunion of the separated pure aluminum and the impure metal melt through the gas pervious layer is prevented by the high surface tension of the molten metal; as a matter of fact, a thin oxide skin formed on the molten raw metal would enable the separation of pure aluminum, if the temperature of the face of this skin is lower than the temperature of the skin itself.

Gas pervious layers constructed in conformity with the invention, are by way of example illustrated in the attached drawings.

In these drawings

Figs. 1, 2, 3, 4 show vertical sectional views of these gas pervious layers.

In conformity with the embodiment shown in Fig. 1, the lower portion of a reaction vessel 1 is surrounded and heated by a furnace 5. An impure aluminum containing melt 2 is located in the bottom portion of this vessel; aluminum chloride is added to the melt and fills the space above the same.

A layer 3 consisting of alumina powder is located on top of the aluminum melt 2; consequently, the upper or outside face 15 of the layer 3 is cooler than its lower face 14, which is in contact with the melt; a temperature decrease takes place within layer 3 in an upward direction. The reaction vessel 1 is airtightly closed.

The aluminum enriched aluminum chloride vapors produced by the reaction within the melt enter the lower face 14 of the porous alumina layer 3, ascend this layer, and are thereby cooled; the purified aluminum metal vapors are condensed in the outside face 15 of layer 3, which lies opposite to face 14 in the flow direction of the aluminum vapors.

Figure 2:
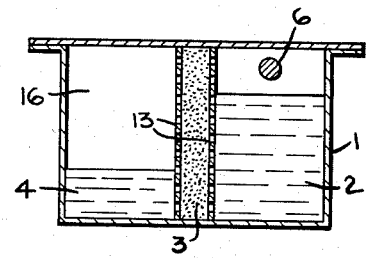

In the embodiment of the invention shown in Fig. 2, a closed reaction vessel 1 is shown, which is separated into two chambers 2 and 16 by a porous vertical wall consisting of a layer of pulverulent materials which are inert to the aluminum vapors and may consist of alumina, silica or clay powders; this layer is encased between two perforated lateral walls 13.

An impure aluminum containing charge in admixture with an aluminum halogenide, such as particularly chloride or fluoride, is held in the right chamber 2 in the molten state by means of a current carrying graphite rod 6. The mixture of aluminum and aluminum halogenide vapors produced by the reaction with the aluminum halogenide in the hot impure aluminum containing melt flows through the wall 3 and the aluminum is condensed and collected in the sump 4 of the cooler chamber 16.

Figure 3:
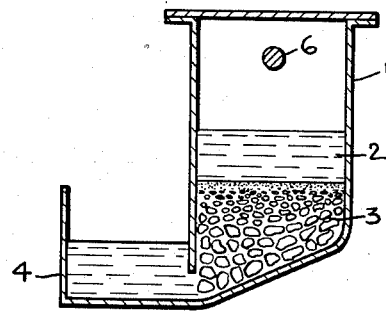

In conformity with Fig. 3, the aluminum containing crude melt 2 is located in an airtight chamber 1 above the gas pervious layer 3. Also in this case, the reacting mixture of the aluminum containing charge and of the aluminum halogenide is held in the molten state by a current conductive graphite rod 6. The vapor pervious layer 3 consists of chemically inert and heat resistant particles of a downwardly increasing size. The vapors produced by the reaction of the aluminum containing melt with the aluminum halogenide flow downwardly and fill the spaces of the porous layer 3. The pure thus created aluminum is condensed in the lower portion of the layer 3, which is cooled by the surrounding atmosphere, whereas the melt and the upper portion of the layer 3 is heated. The condensed aluminum is collected in sump 4.

As already stated, this process must be performed in an airtightly closed vessel, because the oxygen as well as the nitrogen would react at the reaction temperature of the process with these gases. Since the process may be carried-out at a lower or higher than normal pressure, it should be performed in a gas-tight steel vessel, which is provided at the inside with a heat insulating and chemically resistant coating, preferably consisting of alumina containing stamping masses.

To avoid heat losses this insulating layer should be made as thick as possible in order to create at the outside a low temperature. Since, however, insulating materials are generally gas permeable, it is unavoidable that at the inside a partial condensation may take place of the reactants, whereby considerable pressure variations may result.

In order to eliminate this disadvantage, the gas-tight outside wall of the reaction vessel is maintained at a temperature, which is higher than the evaporation of sublimation temperature of the aluminum haligenides or the produced aluminum sub-compounds; the same refers to tubes and armatures attached to the outer wall and connected to the inner space of the reaction vessel.

An external temperature increase of the outer wall of the reaction vessel may be obtained by dimensioning the inner coating of said vessel in such a manner that a sufficient heating is effected from the inside; however, in this manner, an undesirably great quantity of heat will be lost by outside radiation.

The above recited purposes are best served by the addition to the inner heat insulation coating of a similar heat insulating layer applied to the outside of the reaction vessel. In this manner, a guarantee will be obtained, that the vapors of the reacting halogenides do not condense on the gas-tight external coating; on the other hand, a considerable reduction will be achieved of the total heat economy of the plant.

It is, of course, possible to heat the gas-tight wall of the reaction vessel to the desired temperature by additional heating means.

Figure 4:
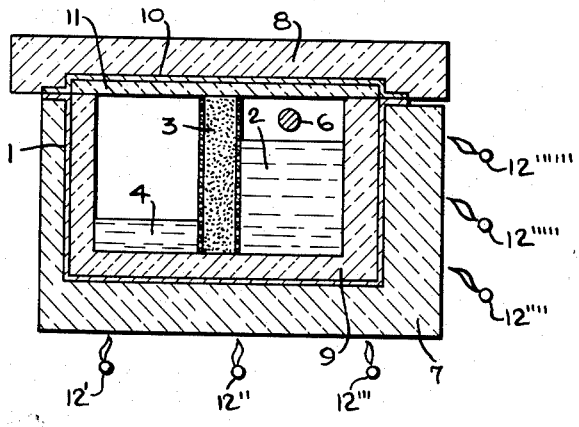

An embodiment of the invention, where these operative conditions are properly considered, is shown in Fig. 4.

The outer wall of the reaction vessel 1, consisting of steel, is coated with an inner layer of an alumina containing stamping mass 9. A vertical porous plate 3, as also shown in Fig. 2, is located in vessel 1. The impure aluminum is charged into the right chamber 2; an electrically heated graphite rod 6 is provided in this chamber.

In the left chamber the pure aluminum 4 is condensed. The inner space of the reaction vessel is filled with aluminum chloride vapors. The reaction vessel is protected against heat loss by an outer insulating layer 7, in such a manner, that the temperature of the wall of the reaction vessel 1 may not sink below 200° C. The same is true of cover 10, which is provided with an inner coating 11 and an outer insulation 8. A number of gas burners $12^1$–$12^{111111}$ are located at the outside of the vessel. The outer insulation 7 may eventually be omitted entirely or partly, if outer heating is applied. On the left side of the reaction vessel, inner as well as the outer insulation may be thickness-reduced in order to maintain the temperature gradient required for the reaction in the inner space of the reaction vessel.

It will be apparent to those skilled in the art that the novel principles of the invention disclosed herein in connection with specific exemplifications thereof will suggest various other modifications and applications of the same. It is accordingly desired that in construing the breadth of the appended claims, they shall not be limited to the specific exemplifications of the invention described herein.

Having thus described the invention, what I claim as new and desire to be secured by Letters Patent, is as follows.

1. A method for the recovery of pure aluminum from aluminum containing materials, the steps of reacting the said materials in the molten state with an aluminum compound in an airtight vessel to produce aluminum enriched vapors, passing the said vapors through a porous layer consisting of heat-refractory granular materials which are inert to the action of the aluminum rich vapors, maintaining within said layer a temperature decrease in the direction of the vapor flow and condensing the aluminum vapors at the surface of the porous layer directly after the exit of the gases from said layer.

2. In a method for the recovery of the pure metal from impure aluminum, the steps of heat reacting the impure molten metal in a first compartment of an airtightly sealed chamber with an aluminum halogenide to produce aluminum vapors, passing said vapors through a partition located in said chamber and composed of a porous layer of heat resistant granules inert to the action of the reaction vapors into a second unheated compartment of said chamber, maintaining thereby within said layer a continuous gradual temperature decrease and thus condensing the aluminum vapors at the surface of the porous layer directly after the exit of the gases from said layer.

3. In a method for the recovery of the pure metal from impure aluminum, the steps of heat reacting the molten impure metal in a first compartment of an airtightly sealed chamber with an aluminum halogenide to produce aluminum enriched vapors, conducting the said vapors through a porous partition located in said chamber and consisting of heat resistant loose granules inert to the action of said vapors into a second unheated compartment of said chamber, maintaining thereby in said layer a continuous and gradual temperature decrease and condensing the aluminum vapors after passage through said layer on the cool face of the same.

4. In a method according to claim 2, the use of loose alumina granules for said layer.

5. In a method according to claim 3, the use of loose magnesium oxide granules for said layer.

References Cited in the file of this patent

UNITED STATES PATENTS

| | | |
|---|---|---|
| 905,753 | Shortman | Dec. 1, 1908 |
| 2,271,023 | Nelson | Jan. 27, 1942 |
| 2,470,305 | Gross | May 17, 1949 |